May 26, 1931.　　　J. LEDWINKA　　　1,807,317

WINDSHIELD MOUNTING

Filed May 26, 1928

INVENTOR.
JOSEPH LEDWINKA.
BY
ATTORNEY.

Patented May 26, 1931

1,807,317

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

WINDSHIELD MOUNTING

Application filed May 26, 1928. Serial No. 280,695.

My invention relates to a windshield construction and more particularly to a structure for mounting the windshield in which the windshield fits within a reentrant portion of the windshield frame.

It is an object of my invention to provide a neat and ornamental mounting for the windshield in the frame, one which is easily effected, and furthermore, one which permits the mounting of a windshield having the usual straight hinged connection to the frame at the top, which extends substantially the full width of the windshield, in a reentrant portion having an upper surface curved transversely or otherwise of irregular shape, i. e., of a shape other than rectilinear.

I attain this object by providing a mounting strip of substantially the thickness of the windshield having its upper face conform to the curvature or other irregularity of the reentrant portion of the windshield frame and its lower surface rectilinear and conforming to the rectilinear upper edge of the windshield, whereby the windshield hinge secured to the upper edge of the windshield may be extended the full width of the windshield, as usual, and secured to said mounting in its lower rectilinear portion. The novel construction finds its best embodiment in sheet metal, since this permits the ready concealing of the securing means for the mounting strip and the particular construction also finds its principal use in connection with sheet metal windshield frames in which the top and sides are formed by a single stamping, the reentrant portions at the sides and top being die drawn and necessarily joined by well rounded curves and the top reentrant face is preferably curved transversely to the curvature of the roof. The novel mounting also lends itself to the ready assembly of the windshield and mounting strip as a separate sub-assembly unit adapted to be easily and quickly assembled in the windshield frame in the final assembly as a unit.

Figure 1:
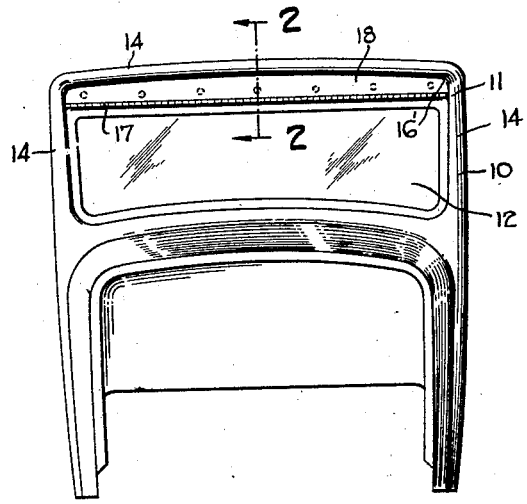
Figure 2:
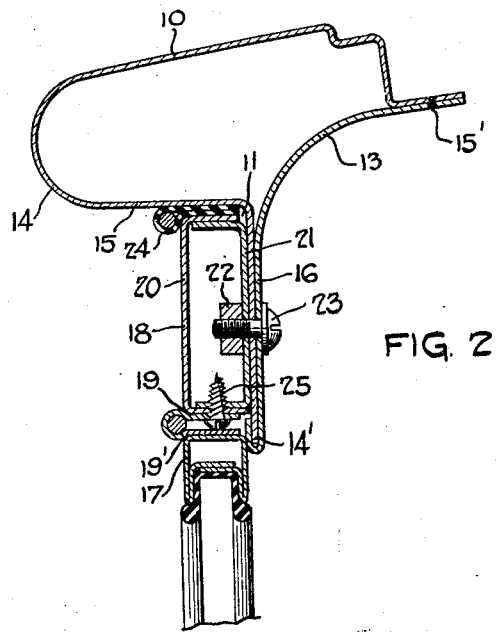

Other and further objects and advantages will become apparent from the following detailed description of a preferred embodiment of my invention when read in connection with the accompanying drawings, in which Fig. 1 is a front elevation of an automobile body in which I have shown my invention embodied, and Fig. 2 is a detail sectional view, the section being taken approximately on the line 2—2 of Fig. 1.

The windshield frame to which I have shown my invention applied and to which it is particularly applicable is made up out of an outer stamping 10 extending entirely around the windshield opening and having the rabbeted or reentrant portion 11 extending entirely around the windshield opening and adapted to receive the windshield 12. To stiffen and strengthen this outer stamping it is usual to provide an inner panel 13 secured to the outer panel in the margin of the windshield opening as by crimping as shown at 14', Fig. 2, and at points remote from said opening, as by spot welding as indicated at 15', Fig. 2.

The formation of the forward portion of the windshield frame by die stamping and the desirability and necessity, for pleasing appearance, of having the forwardly projecting rounded portions 14 of the frame at sides and top of substantially uniform size and the top portion curved to conform to the transverse curvature of the roof, bring about a structure in which the horizontally extending surface 15 of the top portion of the rabbeted or reentrant portion 11 is curved transversely throughout, see Fig. 1 and has a more pronounced curvature, as at 16', where it joins the reentrant side portions.

The rear wall 16 of the rabbeted portion 11 at the top, is, as shown in Fig. 2, of double thickness, being formed by overlapped portions of the inner and outer panels and is relatively deep as compared with the rabbets at the side as clearly appears from a comparison of Figs. 1 and 2. This double rear wall 16 forms a strong member for securing my improved windshield mounting.

As shown in Fig. 1, the windshield has the rectilinear upper edge sash frame member 17 which extends upwardly a sufficient distance to overlap the downwardly projecting wall 16 at the rear of the rabbet. To fill in the space between the straight upper edge member 17 of the windshield and the curved horizontal wall 15 of the top rabbet or reentrant portion 11, I provide a mounting strip 18 of a thickness substantially equal to the thickness of the windshield sash frame so as to have its forward face lie substantially in the plane of the forward face of the sash frame of the windshield. This mounting strip has its top edge curved to conform to the contour of the top wall 15 and its bottom edge rectilinear to conform to the rectilinear top sash frame member 17 of the windshield 12. The rectilinear edge adapts it for the securement thereto of one strap element 19 of a hinge extending from side to side of the windshield opening, the other strap element 19' being secured to the top sash frame member 17 of the windshield.

For ease and simplicity of manufacture the mounting strip 18 is comprised of a sheet metal stamping 20 of channel cross section presenting rearwardly. To reinforce this channel a corresponding channel section stamping, as 21, is telescoped within the side walls of the channel stamping 20, the side walls of the channels being secured together as by spot welding to form a box section structure. The member 21 may be continuous from end to end of the member 20, or separate channels arranged at spaced intervals, as desired.

The mounting strip so constructed is readily secured in place by fastening means concealed from the outside. As shown in Fig. 2, such means may comprise a tapping block or blocks, as 22 secured to the inside of the web of the channel member 21 and cooperating with screws as 23 extending through the double wall 16 to clamp the strip against said wall.

To secure a weather proof joint between the top and sides of the mounting strip 18 and the wall 15 of the frame, a weather strip 24 may be inserted at this point.

The windshield hinge strap element 19 may be readily secured to the rectilinear bottom wall of the mounting strip by drive screws such as 25. This connected windshield 12 and mounting strip 18 form a sub-assembly unit which can readily be mounted as a unit in position in the windshield frame in the final assembly.

What I claim and desire to secure by Letters Patent is:—

1. In a windshield mounting, a windshield frame having a reentrant portion to receive a windshield, said reentrant portion having an upper and rear surface at the top, a mounting strip of channel shape secured with the mouth thereof presenting toward the rear wall of said reentrant portion and having its top side conform to the top wall of said reentrant portion, means bridging the mouth of the channel and means associated with said bridging means for securing the mounting strip to the rear wall of the reentrant portion.

2. In a windshield mounting, a windshield frame having a reentrant portion extending entirely around the windshield opening and terminating in a continuous flange defining said opening and lying in one plane, the upper portion of said flange being of greater depth than the remaining portions thereof and the top edge of said upper portion being curved, a windshield mounting filler having a curved upper edge and straight bottom edge secured flatwise against said upper portion of the flange with the curved upper edge thereof in coincidence with said curved top edge of the flange, and a windshield hingedly connected to the straight bottom edge of said filler and adapted to contact with the inner extremities of said continuous flange.

3. In a windshield mounting, a windshield frame having a reentrant portion extending entirely around the windshield opening and terminating in a continuous flange defining said opening and lying in one plane, the upper portion of said flange being of greater depth than the remaining portions thereof and the top edge of said upper portion being curved, and a windshield mounting filler having a curved upper edge and a straight bottom edge secured flatwise against said upper portion of the flange with the curved upper edge thereof being coincident with said curved top edge of said flange.

In testimony whereof I hereunto affix my signature.

JOSEPH LEDWINKA.